United States Patent [19]

Marlowe

[11] Patent Number: 5,103,986
[45] Date of Patent: Apr. 14, 1992

[54] CARTRIDGE RACK

[75] Inventor: Christian P. Marlowe, Nederland, Colo.

[73] Assignee: Exabyte Corporation, Boulder, Colo.

[21] Appl. No.: 434,979

[22] Filed: Nov. 9, 1989

[51] Int. Cl.⁵ ............................................ A47G 19/08
[52] U.S. Cl. ..................................... 211/41; 211/126; 206/387
[58] Field of Search ............... 211/41, 88, 94, 126; 206/387; 312/8-10

[56] References Cited

U.S. PATENT DOCUMENTS

| | | | |
|---|---|---|---|
| D. 257,496 | 11/1980 | Berkman | D3/35 |
| 3,736,036 | 5/1973 | Mathus | 312/285 |
| 3,770,333 | 11/1973 | Cusker | 211/184 |
| 3,889,817 | 6/1975 | Berkman | 211/163 |
| 3,907,116 | 9/1975 | Wolf et al. | 211/40 |
| 4,003,468 | 1/1977 | Berkman | 206/387 |
| 4,361,861 | 11/1982 | Spapens | 211/41 X |
| 4,366,903 | 1/1983 | Gaiser et al. | 206/387 |
| 4,411,481 | 10/1983 | Berkman | 312/8 |
| 4,574,959 | 3/1986 | Hollett | 211/41 |
| 4,592,610 | 6/1986 | Bowls | 211/41 X |
| 4,700,846 | 10/1987 | Schroeder | 211/41 |
| 4,730,735 | 3/1988 | Lechner | 312/8 X |
| 4,779,730 | 10/1988 | Hartsfield et al. | 206/387 |

Primary Examiner—Blair M. Johnson
Attorney, Agent, or Firm—Griffin Branigan & Butler

[57] ABSTRACT

A cartridge rack (70) includes ribs (816) for partitioning the rack into cells (826) for accommodating magnetic tape cartridges. A pair of resilient engagement fingers (832) are provided in each cell (826). Each engagement finger (826) has a chevron-shaped projection (840) to engage a light path window (862) provided on a lid of a standard 8 mm. magnetic tape cartridge. The ribs (816) also have a cartridge engagement ridge (860) thereon which engages a larger lip gap (863L) of a standard 8 mm. magnetic tape cartridge when the cartridge is inserted in a required orientation into a cell (826) of the rack (70). The rack (70) also has a bridging member (818) which is surmounted by an indicia (868) bearing projection (866). The rack (70) further has resilient engagement tabs (870) for mounting the rack (70) on an extrusion mount (76). Orientation means (880) are provided on a bottom wall of the rack (70) to preclude the rack from being mounted on the extrusion mount in any but the required orientation.

32 Claims, 6 Drawing Sheets

CARTRIDGE RACK

BACKGROUND

1. Field of Invention

This invention pertains to devices for housing a plurality of cartridges of the type used for storing information, such as magnetic tape cartridges.

2. Prior Art and Other Considerations

Replicatable information has been stored on various types of storage medium. These types of storage media have acquired various packages, including disk-shaped phonograph records, magnetic tape reels, and magnetic tape cartridges.

A need exists for a storage device for magnetic tape cartridges, particularly for a device for storing a plurality of selectively retrievable cartridges. It is desired that the cartridges remain securely within the device absent a deliberate retrieval effort, so that the device can be easily transported or oriented in diverse manner without the cartridges being prone to fall out of the device.

Moreover, in some applications it is required that cartridges be uniformly oriented in the storage device. There must be some protection against cartridges being incorrectly oriented in the storage device, particularly when cartridge retrieval and insertion from the storage device is automated.

Accordingly, it is an object of the present invention to provide a rack for securely storing magnetic cartridges regardless of the orientation of the storage device.

An advantage of the present invention is the provision of a cartridge rack that prevents insertion of a cartridge therein unless the cartridge has an acceptable orientation.

A further advantage of the present invention is the provision of a cartridge rack that has readable indicia strategically located thereon.

Yet another advantage of the present invention is the provision of a cartridge rack that is mountable on an external mount.

Still another advantage of the present invention is the provision of a cartridge rack that is mountable only in a required orientation on an external mount.

SUMMARY

A cartridge rack includes ribs for partitioning the rack into cells for accommodating magnetic tape cartridges. A pair of resilient engagement fingers is provided in each cell. Each engagement finger has a chevron-shaped projection formed thereon. The resilient engagement fingers are sized and situated so that the chevron-shaped projections engage light path windows provided on a lid of a standard 8 mm. magnetic tape cartridge. Engagement by the chevron-shaped projections permit the rack to be carried or mounted in any orientation without the cartridges falling out of the rack.

The ribs of the rack also have a cartridge engagement ridge thereon which engages a lid gap of a standard 8 mm magnetic tape cartridge when the cartridge is inserted in a required orientation into a cell of the rack. The cartridge engagement ridge precludes a cartridge from being inserted into a cell in any but the required orientation.

In addition to having cell-defining ribs, the rack of the invention has a bridging member which also serves a cell partitioning function. The bridging member has a projection mounted thereon which bears a detectable indicia, such as reflective indicia detectable by a reader device such as a bar code scanner.

The rack of the invention has resilient engagement tabs for mounting the rack on an extrusion mount. The extrusion mount serves to mount one or more of the racks of the invention to a wall surface, such as a vertical wall included in a cartridge library. Orientation means are provided on a bottom wall of the rack to preclude the rack from being mounted on the extrusion mount in any but a desired orientation.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 6:
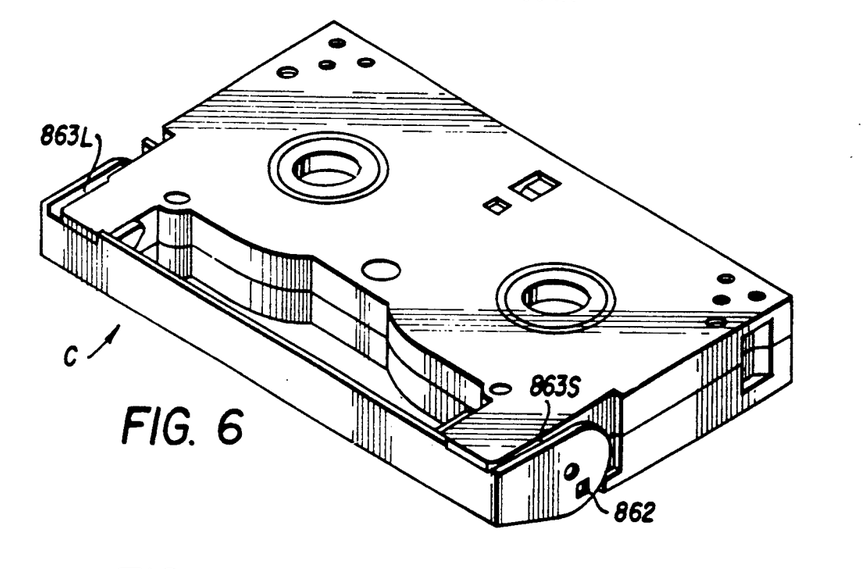
FIG. 6 is a bottom isometric view showing a magnetic tape cartridge of the type storable in the rack of the embodiment of FIG. 1.

FIGS. 1, 2A, 2B, 2C, 3 and 4 show a rack 70 according to a preferred embodiment of the invention. A plurality of information storage medium cartridges, such as the standard 8 mm magnetic tape cartridge C shown in FIG. 6, are storable in the rack 70 of the invention. As used herein, "information storage medium" includes, but is not limited to, magnetic tape. "Information" includes audio and video-producing signals as well as data-producing signals.

Figure 5A:
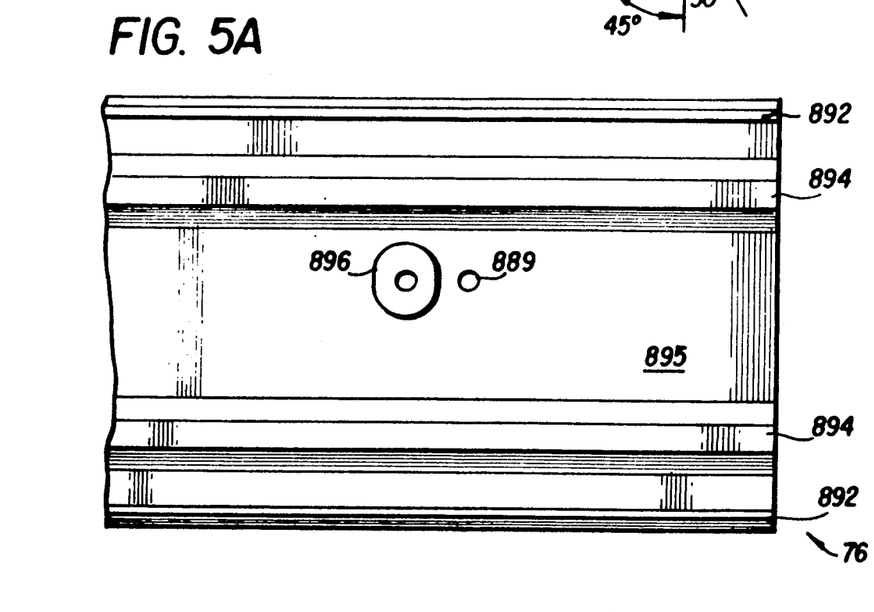
FIG. 5A is a front view of a portion of a rack mount for with the cartridge rack of the embodiment of FIG. 1.
Figure 5B:
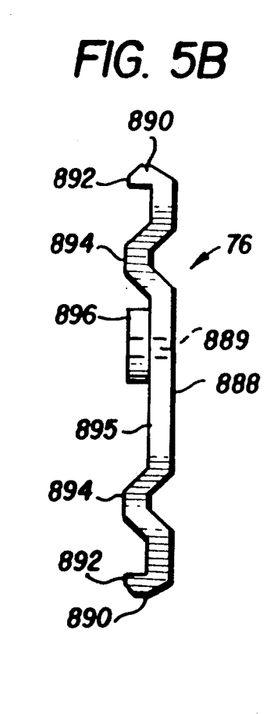
FIG. 5B is a side view of a portion of a rack mount for use with the cartridge rack of the embodiment of FIG. 1.

FIGS. 5A and 5B show a rack extrusion mount 76 by which the racks 70 can be mounted to a vertical wall. One type of vertical wall, upon which the extrusion mount 76 can be installed for the mounting of a plurality of racks 70 thereon, is a wall included in the cartridge library system of commonly assigned, U.S. patent application Ser. No. 07,434,099, entitled READING METHOD AND APPARATUS FOR CARTRIDGE LIBRARY, simultaneously filed herewith and incorporated herein by reference.

Figure 2A:
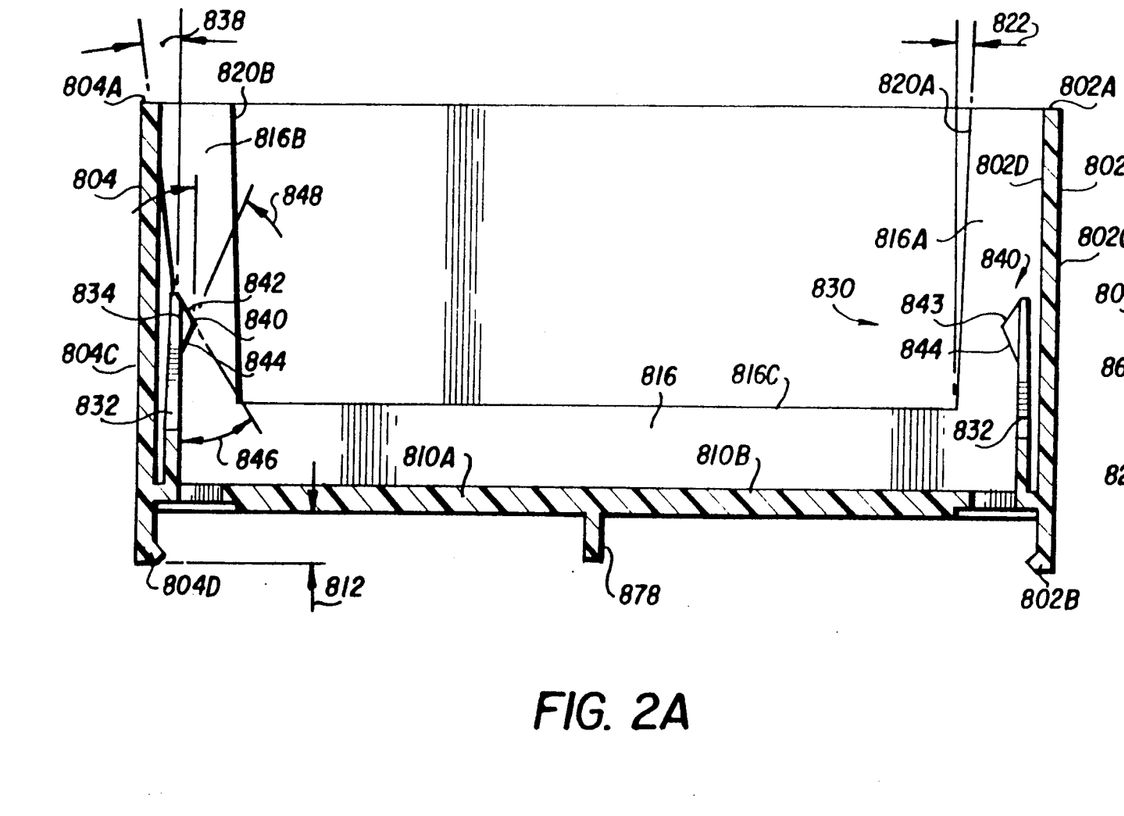
FIG. 2A is a sectioned side view, taken along line 2A—2A, of FIG. 1.

Each rack 70 is essentially rectangular in shape, having two opposing parallel side walls 802 and 804; two opposing parallel end walls 806 and 808; and, a bottom wall 810. Side walls 802 and 804 have respective top edges 802A and 804A; respective bottom edges 802B and 804B; respective exterior surfaces 802C and 804C; and, respective interior surfaces 802D and 804D. The bottom wall 810 has an exterior surface 810A and an interior surface 810B. As shown in FIG. 2A, the bottom wall 810 is spaced away from the bottom edges 802B and 804B of the side walls 802 and 804 by a distance 812.

The rack 70 is partitioned into a plurality of cells by eight ribs 816 and a bridging member 818. The bridging member 818 is positioned midway between the end walls 806 and 808 (to which bridging member 818 is parallel). The bridging member 818 spans the side walls 802 and 804 (to which bridging member 818 is perpendicular). Thus, four ribs 816 (in particular ribs $816_1$-$816_4$ shown in FIG. 1) are located on a first side of the bridging member 818, while four other ribs 816 (ribs $816_5$-$816_8$) are located on a second side of the bridging member 818.

Figure 1:
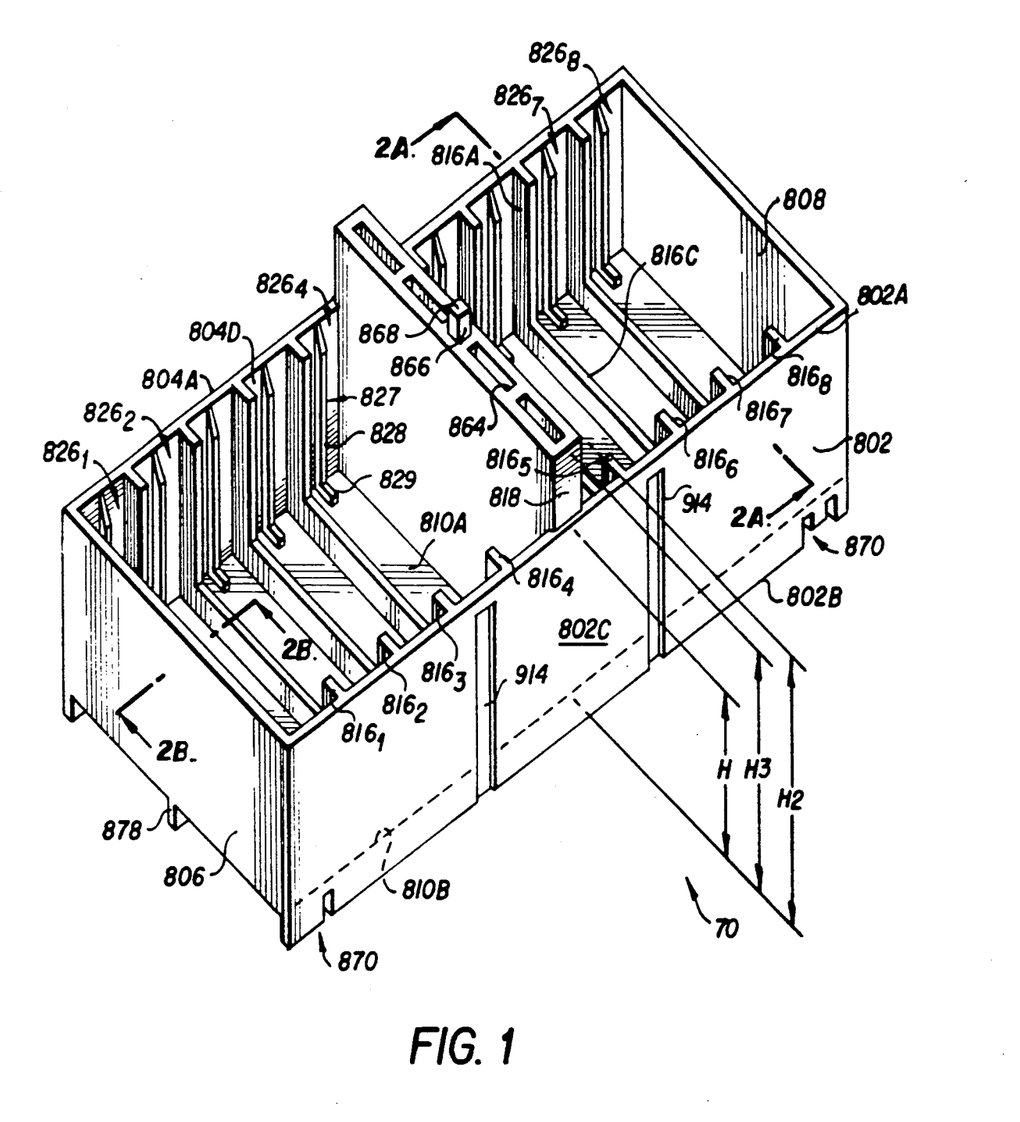
FIG. 1 is an isometric view of a rack for storing a plurality of cartridges according to an embodiment of the invention.

As shown in FIGS. 1 and 2A, each of the ribs 816 have two rib wall members 816A and 816B and a rib floor member 816C. The two rib wall members 816A and 816B of each rib 816 are coplanar and lie in a plane which is both parallel to the end walls 806 and 808 and perpendicular to the side walls 802 and 804. The two rib wall members 816A and 816B are attached to the interior side wall surfaces 804C and 802C, respectively. The rib floor member 816 is attached to the rack bottom wall 810.

The two rib wall members 816A and 816B have interior edges 820A and 820B, respectively. The rib wall interior edges 820A and 820B are inclined at an angle 822 of about 1.5 degrees with respect to the planes of the side wall interior surfaces 802D and 804D, respectively.

The ribs 816 are separated from one another (and from the bridging member 818) by a distance just sufficiently large to accommodate a standard 8 mm magnetic tape cartridge therebetween. Thus, two adjacent ribs 816, or the bridging member 818 and an adjacent rib 816, form a cartridge cell 826 for accommodating a cartridge.

As mentioned above, ten such cartridge cells 826 (cells $826_1$-$826_8$) are provided in the rack 70. Five of the cells (cells $826_1$-$826_4$) are provided on a first side of the bridging member 818; five of the cells (cells $826_5$-$826_8$) are provided on a second side of the bridging member 818. Each rib 816 has a rib surface which faces a lower order cell and a rib surface which faces a higher order cell. For example, with reference to FIG. 2B, the wall of rib $816_1$ has a rib surface $816_{1L}$ which faces cell $826_1$ and a rib surface $816_{1H}$ which faces cell $826_2$.

Each cell 826 is subpartitioned into half cells by a pair of opposed secondary ribs 827. As shown in FIGS. 1 and 2A, each secondary rib 827 comprises a secondary rib wall spine 828 and a secondary rib foot 829.

Figure 2B:
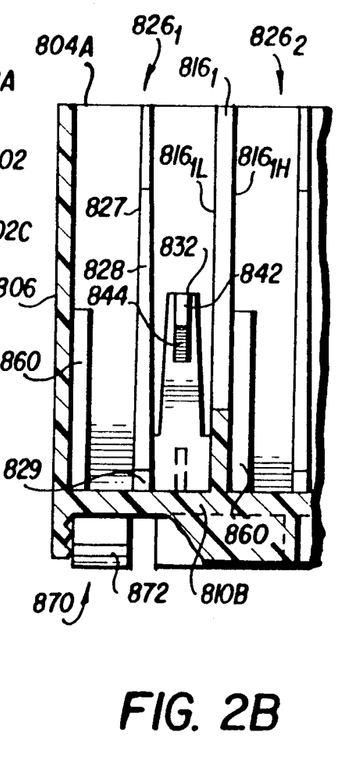
FIG. 2B is a sectioned view, taken along line 2B—2B, of FIG. 1.

As shown in FIG. 2A, the rack 70 has retaining means 820 provided in each cell 826 for securely retaining therein an inserted cartridge. The retaining means 820 includes a pair of resilient, cantilevered retaining fingers 832 provided in each cell 826. A proximal end of each retaining finger 832 is integrally formed with the rack bottom wall 410; the distal end of each retaining finger 832 extends upwardly into the interior of its associated cell 826 from near the intersection of the side wall 802 or 804 and the bottom wall 410. As shown in FIG. 2B, both retaining fingers 832 for each pair are provided on second sides of the secondary ribs 827 which partition the cell 826 into subcells.

Each retaining finger 832 has an interior surface 834 which faces the interior surface of the opposing retaining finger with which it is paired. When a cell 826 is empty, the retaining finger interior surfaces 834 are essentially parallel to the side wall interior surfaces 802D and 804D. However, when a cartridge is inserted into a cell 826, the retaining fingers 832, and hence the retaining finger interior surfaces, flex back toward the side wall interior surfaces 802D and 804D to accommodate the cartridge therebetween.

Near its distal end, and commencing at point 836 on the interior surface 834 thereof, each retaining finger 832 is beveled to taper at an angle indicated by reference numeral 838 (see FIG. 2A), which is on the order of about 6 degrees. At its distal end each retaining finger 832 has a chevron-shaped projection 840 provided thereon. The chevron-shaped projections 840 face into the interior of the cell 826 and include a first chevron face 842 and a second chevron face 844. As shown in FIG. 2A, the first chevron face 842 is inclined at an angle (indicated by reference numeral 846) with respect to the retaining finger interior surface 834; the second chevron face 844 is inclined at an angle (indicated by reference numeral 848) with respect to the beveled end surface of the retaining finger interior surface 834. In the illustrated embodiment, angle 846 is on the order of about 32 degrees; angle 848 is on the order of about 20 degrees. The retaining finger 832 is designed to be in a relaxed state when engaged with a cartridge, thereby preventing fatigue of the finger 832.

Figure 2C:
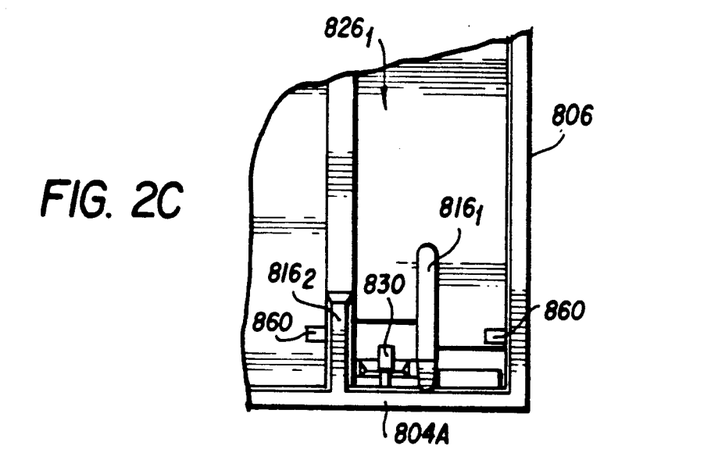
FIG. 2C is a top view of a portion of the rack of FIG. 1.

As shown in FIGS. 2A and 2C, each rib 816 has a cartridge lid gap engagement ridge 860 formed thereon. The cartridge lid gap engagement ridge 860 is formed on the surface of rib wall 816B which faces the higher order cell. For example, in FIG. 2A the cartridge lid gap engagement ridge 860 is formed on the surface $816_{1H}$, so that the ridge 860 extends into cartridge cell $826_2$.

The interior surface of rack end wall 806 and the bridging member 818 also have cartridge lid gap engagement ridges 860 formed thereon. As shown in FIG. 2B, the cartridge lid gap engagement ridge 860 formed on the end wall 806 extends into the cartridge cell $826_1$. Although not visible in the figures, it should be understood that the bridging member 818 has a cartridge lid gap engagement ridge 860 thereon which extends into the cartridge cell $826_5$.

As illustrated in FIG. 2C, the cartridge lid gap engagement ridges 860 are spaced away from the rack wall interior surface 804D by a slight distance on the order of about 0.063 inches. The cartridge lid gap engagement ridges 860 extend about half the height of the rack wall interior surface 804D and are parallel thereto.

With the rack 70 and cells 826 thereof configured in the manner just described, the chevrons 840 provided on the pair of retaining fingers 832 for each cell 826 are shaped and positioned to engage light path windows 862 provided on opposite sides of a lid of a standard 8 mm magnetic tape cartridge (see FIG. 6), when a cartridge is inserted into the cell. Location of the retaining fingers on one side of the secondary ribs 827 prevents a cartridge from being inserted into the cell 826 in any other but a predefined required orientation.

In addition, when a cartridge is inserted into a cell 826, the cartridge C slidingly fits over the cartridge lid gap engagement ridge 860. In this respect, when viewed from its bottom, a standard 8 mm magnetic tape cartridge such as cartridge C of FIG. 6 has a pair of lid gaps 863L and 863S occurring between the cartridge lid and respective end faces of the cartridge case. One of the gaps (gap 863L) is larger than the other gap (863S). The cartridge lid gap engagement ridge 860 is sized so that only the larger lid gap 863L can fit over the ridge 860, meaning that the cartridge can only fit in the cell 826 if the cartridge is oriented so that the larger lid gap 863 is aligned with the cartridge lid gap engagement ridge 860. The cartridge lid gap engagement ridge 860 thus also serves for preventing a cartridge from being inserted into cell 826 in any other but the predefined required orientation.

As shown in FIG. 1 and described above, the bridging member 818 serves as a rib to separate cartridge cells $826_4$ and $826_5$. The bridging member 818 has a top edge 864. The bridging member top edge has an essentially cubic-shaped projection 866 centrally mounted thereon, i.e. substantially equidistant from the rack side walls 802 and 804. Thus projection 866 has a substantially square cross section. The uppermost square surface bears a reflective indicia 868, such as reflective white paint. The indicia 868 is detectable by an electronic reader, such as a bar code reader.

As also shown in FIG. 1, the side walls 802 and 804 extend a predetermined height H1 above the rack bottom wall interior surface 810B. The uppermost square surface of projection 866 extends to a predetermined height H2 above the rack bottom wall interior surface 810B, which height H2 is essentially the same (within 0.030 inch) as a dimension of a standard 8 mm magnetic tape cartridge. The top edge 864 of the bridging member 818 extends a predetermined height H3 above the rack bottom wall interior surface 810B, with height H3 being greater than H1 but less than H2.

The rack 70 has engagement means provided thereon for engaging a mounting member such as the rack support extrusion 76. The engagement means includes four engagement tabs 870 formed on the rack side wall bottom edges 802B and 804B. Two engagement tabs 870 are provided on side wall 802 and two tabs 870 are provided on side wall 804, with all four tabs 870 being located near corners of the rack 70. The tabs 870 on side wall 802 are paired in alignment with the tabs 870 on the side wall 804. The tabs 870 are provided beneath the plane of the rack bottom wall exterior 810A.

Figure 3:
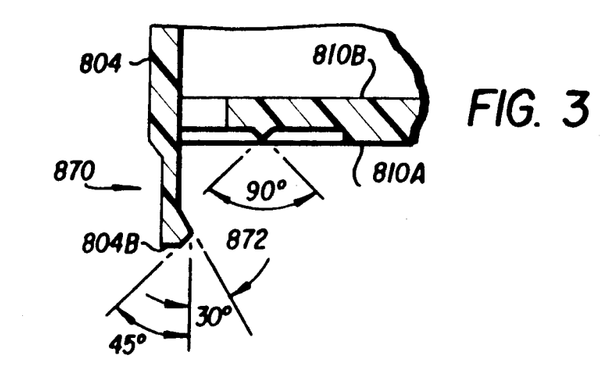
FIG. 3 is a sectioned side view of a portion of a rack mounting tab for the rack of the embodiment of FIG. 1.

Each of the engagement tabs 870 has a projection 872 provided thereon (see FIGS. 2B and 3). The engagement tab projections 872 of each tab 870 extend interiorly beneath the rack to face the paired projection on the other side wall. The tabs 870 depend from their respective side walls 802, 804 in cantilevered manner, each of said tabs 870 having an interior surface, including the projections 872, which is slightly out of the plane of its respective side wall portion for its side wall. The interior surface of a tab 870 is inclined toward the opposing side wall but resiliently displaceable back into coplanar relationship with the side wall 802 when the rack engages a mounting extrusion 76.

Figure 4:
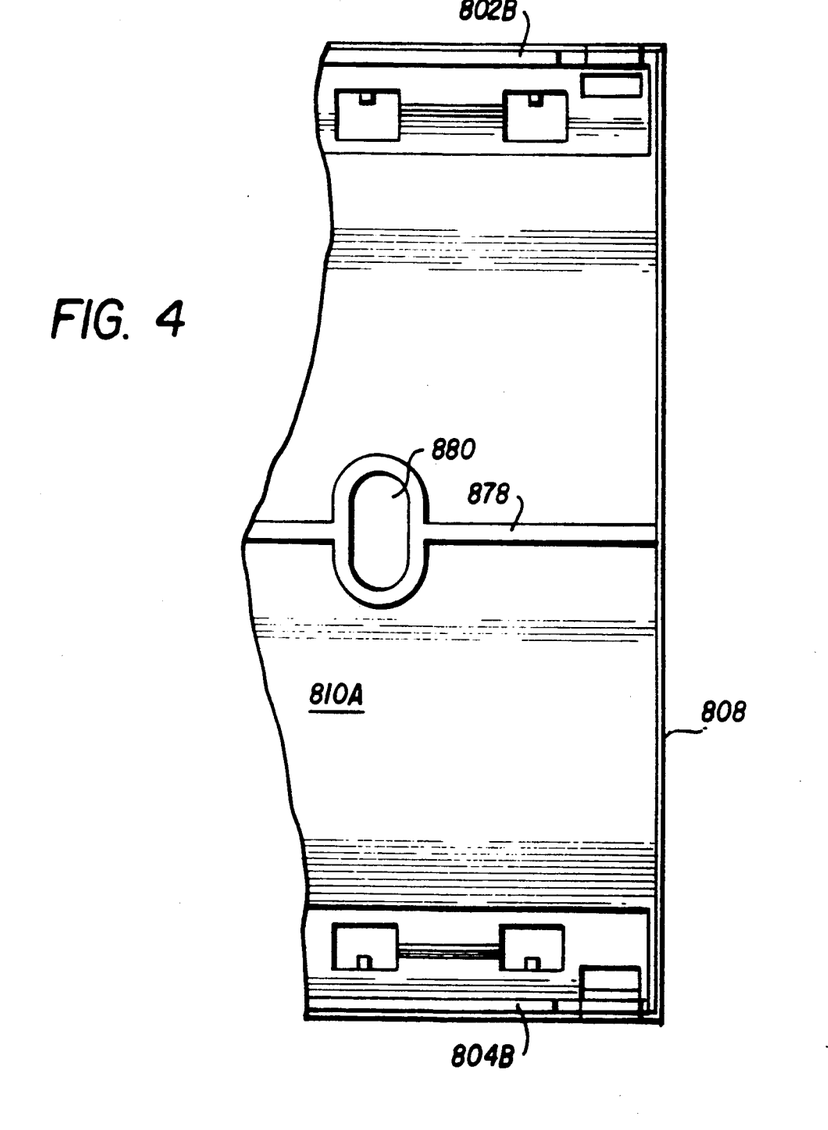
FIG. 4 is a rear view of a portion of a rack of the embodiment of FIG. 1.

As shown in FIGS. 1, 2A, and 4, the rack bottom wall exterior surface 810B has a beam 878 which runs substantially across the rack 70 from end wall 806 to end wall 808. As shown in FIG. 2A, the bottom beam 878 is slightly off-center, being closer to rack side wall 802 than to rack side wall 804. Near the end wall 808 the bottom beam 878 is briefly configured into a oval shape to form a female receptacle 880 (see FIG. 4). This female receptacle 880 serves as orientation guidance means when the rack 70 is being mounted on a member such as the rack mounting extrusion 76 of FIGS. 5A and 5B.

The rack mounting extrusion 76 is an elongated metallic member having the edge profile shown in FIG. 5B. A backside 888 of the extrusion 76 is configured to lie flat against a mounting surface, such as vertical wall of a cartridge library. In this regard, apertures 889, of which only one is shown in FIGS. 5A and 5B, are provided in the extrusion 76 to accommodate wall fasteners.

The edges 890 of the extrusion 76 are curled frontwardly to form ridges 892. The extrusion 76 is profiled to include a pair of interior support ridges 894 on a frontside 895 thereof.

An orientation guide 896 is formed on the extrusion frontside 895. The orientation guide 896 is a round dowel pin. The orientation guide 896 is sized, and located to be received by the female receptacle 880 (see FIG. 4) on rack 70 when a rack 70 is mounted onto the extrusion 76. The oval shape of the female receptacle 880 allows for a swinging motion of the rack 70 when being snapped into the extrusion 76.

When a rack 70 is mounted onto extrusion 76, the rack 70 must have a predetermined orientation in order for the female receptacle 880 of the rack 70 to properly fit over the dowel pin orientation guide 896 of the extrusion 76. The engagement tabs 870 of the rack 70, being resilient, are deflected underneath the rack 70 by the mounting ridges 892 of the extrusion 76. The mounting tabs 870 of the rack thereafter bear outwardly against the mounting ridges 892 to keep the rack 70 securely mounted on the extrusion 76.

Figure 7:
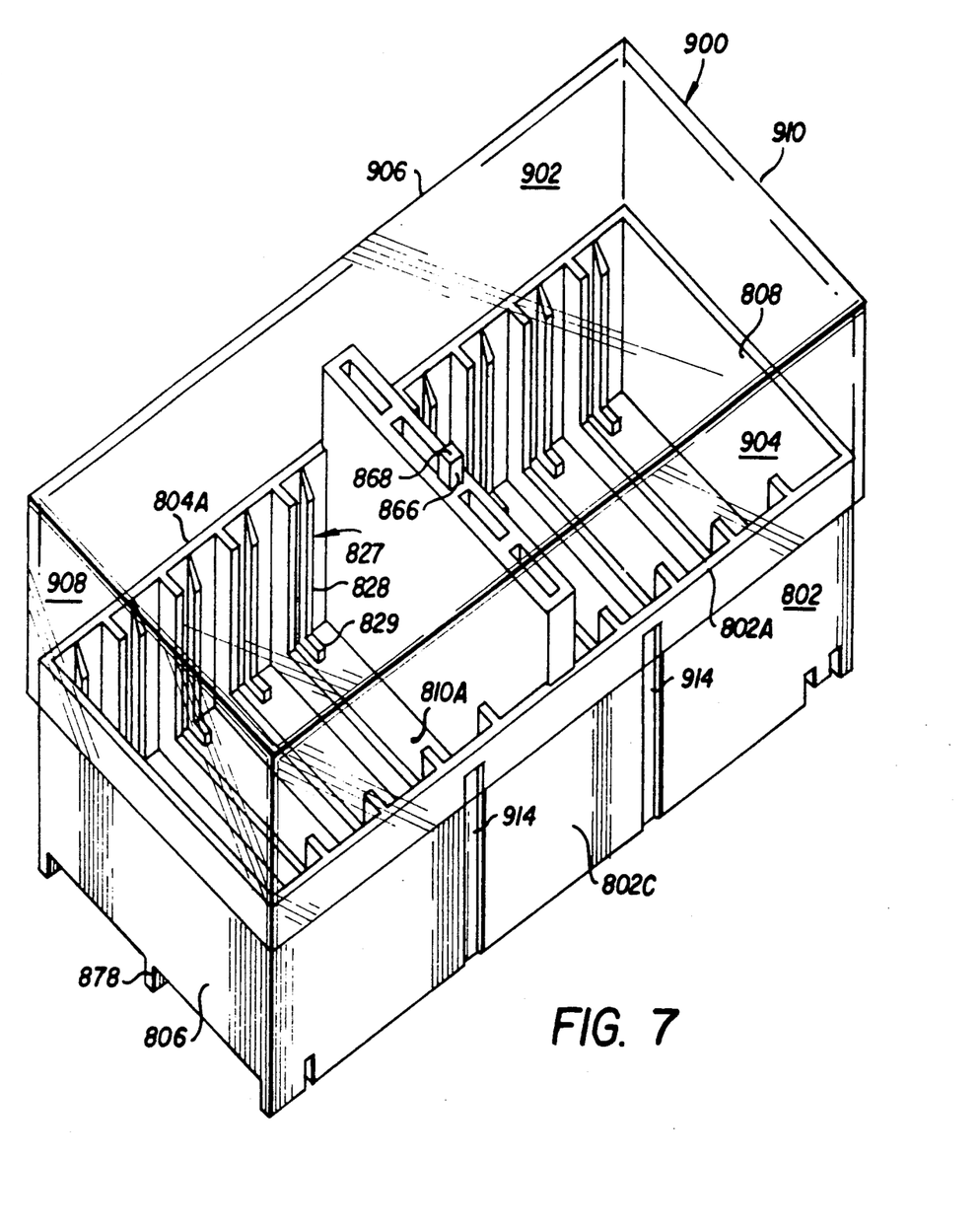
FIG. 7 is an isometric view of a rack for storing a plurality of cartridges according to an embodiment of the invention, together with a lid placed over the rack.
Figure 8:
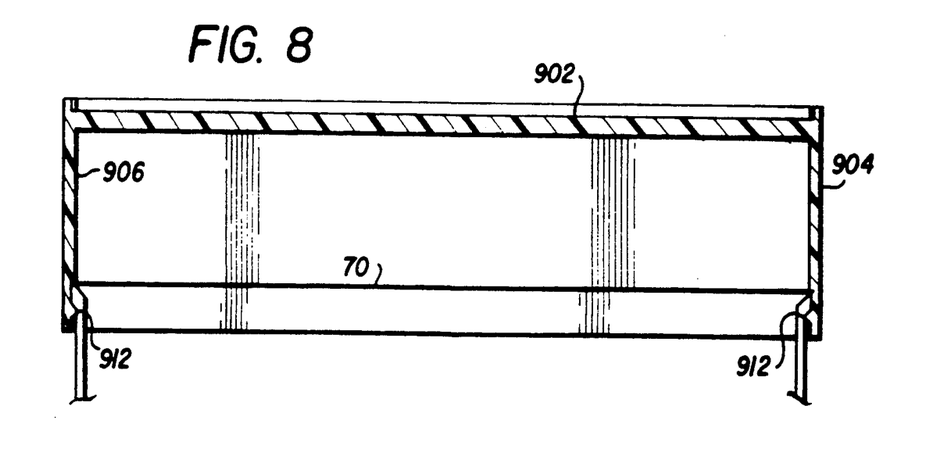
FIG. 8 is an sectioned end view of a lid for covering the rack of the embodiment of FIG. 1

FIG. 7 shows the rack of FIG. 1 covered with a transparent lid 900. The lid 900, rectangular in shape, has a top 902, side walls 904 and 906, and end walls 908 and 910. As shown in FIG. 8, side walls 904 and 906 have reduced widths at their lower ends for fitting over the top of the rack 70. In the reduced width portions, side walls 904 and 906 have inwardly-directed projections 912 formed thereon for engaging channels 914 provided on the exterior surfaces of the rack side walls 802 and 804.

While the invention has been particularly shown and described with reference to the preferred embodiments thereof, it will be understood by those skilled in the art that various alterations in form and detail may be made therein without departing from the spirit and scope of the invention. For example, a rack according to the invention can be sized for usage with other sizes of cartridges, such as 4 mm. magnetic tape cartridges, for example. Moreover, a cartridge rack may be configured to house any number of cartridges.

The embodiments of the invention in which an exclusive property or privilege is claimed are defined as follows:

1. A rack for housing a plurality of information storage medium cartridges, said rack comprising:
   two essentially parallel side walls and a bottom wall, said two side walls extending above said bottom wall by a first predetermined distance;

rib means attached at least to said side walls for partitioning said rack into cells for accommodating said plurality of cartridges;

bridging means connecting said two parallel side walls, said bridging means being essentially orthogonal to said side walls; and, a projection carried on said bridging means, said projection extending above said bottom wall by a second predetermined distance, said second predetermined distance being greater than said first predetermined distance, said projection having a readable indicia thereon.

2. The apparatus of claim 1, wherein said second predetermined distance is essentially equal to a dimension of said cartridge.

3. The apparatus of claim 1, wherein said bridging means forms a partition between two adjacent cells.

4. The apparatus of claim 1, wherein said bridging means extends above said bottom wall by a third predetermined distance, said third predetermined distance being greater than said first predetermined distance but less than said second predetermined distance.

5. The apparatus of claim 1, further comprising two opposed end walls which are essentially orthogonal to said side walls, and wherein said bridging means is positioned intermediate said opposed end walls.

6. The apparatus of claim 1, wherein said projection has an essentially square cross section.

7. The apparatus of claim 6, wherein said projection is situated substantially equidistant from said side walls.

8. The apparatus of claim 1, wherein said indicia is formed with a reflective medium.

9. The apparatus of claim 1, further comprising means to retain each of said cartridges in said cells.

10. A rack for housing a plurality of information storage medium cartridges, said rack comprising:

two opposing side walls, two opposing end walls, and a bottom wall, said two side walls and two end walls extending above said bottom wall by a first predetermined distance;

rib means attached at least to said side walls and said bottom wall for partitioning said rack into cells for accommodating said plurality of cartridges;

bridging means connecting said side walls, said bridging means also serving as a rib to partition two adjacent cells; and, a projection carried on said bridging means, said projection extending above said bottom wall by a second predetermined distance, said second predetermined distance being grater than said first predetermined distance, said projection having a readable indicia thereon, said projection having an essentially square cross section, said projection being situated substantially equidistant from said opposed side walls.

11. The apparatus of claim 10, wherein said bridging means is positioned intermediate said opposed end walls.

12. The apparatus of claim 10, wherein said bridging predetermined distance is essentially equal to a dimension of said cartridge.

13. The apparatus of claim 10, wherein said indicia is formed with a reflective medium.

14. The apparatus of claim 10, wherein said bridging means extends above said bottom wall by a third predetermined distance, said third predetermined distance being greater than said first predetermined distance but less than said second predetermined distance.

15. A rack in combination with an information storage medium cartridge of the type having a light path window provided on a lid thereof, said rack comprising:

two essentially parallel side walls and a bottom wall connected to said side walls;

rib means attached at least to said side walls for partitioning said rack into cells for accommodating a plurality of said cartridges; and, retaining means provided in each cell to retain said cartridge therein; said retaining means for each cell comprising a pair of cantilevered finger members which extend upwardly into the interior of its cell from near the intersection of a side wall and said bottom wall, said fingers of each pair being resiliently displaceable away from one another to accommodate said cartridge therebetween; each of said cantilevered finger members having a retaining surface facing the other finger member with which it is paired, said retaining surface of each finger member having a projection extending therefrom in a direction toward the other finger member with which it is paired, wherein said projections are located to engage said light path window provided on a lid of cartridge.

16. The apparatus of claim 15, wherein said projections which engage a light path window provided on a lid of said cartridge have a chevron shape.

17. The apparatus of claim 15, further comprising:

secondary rib means provided on said side walls for partitioning each of said cells into a half cell, and wherein said retaining means is located on said side wall between said rib means and said secondary rib means.

18. The apparatus of claim 17, wherein in a cell said retaining means is located on said side wall between only one of said rib means forming said cell and said secondary rib means.

19. The apparatus of claim 17, wherein said secondary rib means comprises a secondary rib wall spine and a secondary rib foot.

20. A rack in combination with an information storage medium cartridge of the type having a light path window provided on a lid thereof and a lid gap provided between a cartridge lid and an face of a cartridge case, said rack comprising:

two essentially parallel side walls and a bottom wall connected to said side walls;

rib means attached at least to one of said walls for partitioning said rack into cells for accommodating a plurality of said cartridges; and, retaining means provided in each cell to retain said cartridge therein; said retaining mean for each cell comprising a resilient retaining member attached to said rack, said resilient retaining member having a projection extending therefrom and located to engage said light path window provided on a lid of said cartridge; and, means formed on said rib means for fitting into a lid gap of said cartridge when said cartridge is inserted into a cell of said rack in a predetermined orientation.

21. The apparatus of claim 20, wherein said cartridge lid gap engaging means formed on said ribs comprises a ridge parallel to and slightly spaced apart from one of said sidewalls.

22. The apparatus of claim 20, wherein said cartridge has a pair of lid gaps occuring between the cartridge lid and respective end faces of a cartridge case, wherein one of the lid gaps is larger than the other lid gap, and wherein said cartridge lid gap engaging means is sized so that only one of said lid gaps can fit thereover, thereby preventing said cartridge from being inserted into a cell in any other abut a predefined required orientation.

23. The apparatus of claim 20, wherein said projections which engage a light path window provided on a lid of said cartridge have a chevron shape.

24. A rack in combination with an information storage medium cartridge of the type having a lid gap provided between a cartridge lid and face of a cartridge case, said rack comprising:
two essentially parallel side walls and a bottom wall, said two side walls extending above said bottom wall by a first predetermined distance;
rib means orthogonally attached at least to said side walls for partitioning said rack into cells for accommodating a plurality of said cartridges;
means formed on said rib means for fitting into a lid gap of said cartridge when said cartridge is inserted into a cell of said rack in a predetermined orientation, said cartridge lid gap engaging means for said ribs comprising a ridge parallel to and slightly spaced apart from one of said sidewalls.

25. The apparatus of claim 24, wherein said cartridge has a pair of lid gaps occuring between the cartridge lid and respective end faces of a cartridge case, wherein one of the lid gaps is larger than the other lid gap, and wherein said cartridge lid gap engaging means is sized so that only one of said lid gaps can fit thereover, thereby preventing said cartridge from being inserted into a cell in any other abut a predefined required orientation.

26. A rack for housing a plurality of information storage medium cartridges, said rack being in combination with a rack mount, said rack mount having two opposing mounting ridges protruding therefrom; said rack comprising:
two opposing side walls and a bottom wall connected to said side walls, each of said side walls having a bottom edge and a top edge;
rib means interiorly attached at least to said side walls for partitioning said rack into cells for accommodating said plurality of cartridges; and,
wherein said bottom wall is spaced away from said bottom edge of said side walls, wherein beneath said bottom wall said side wall comprises a major side wall portion and an engagement tab, said major side wall portion of each side forming an essentially planar interior surface facing the other side wall, said tabs being dependent from their respective side walls in cantilevered manner, each of said tabs having an interior surface which is slightly out of the plane of its major side wall portion for its side wall, the interior surface of a tab of a side wall being inclined toward the opposing side wall but resiliently displaceable back into coplanar relationship with said major side wall portion of its side wall for accommodating said mounting ridges of said mounting rack.

27. The apparatus of claim 26, wherein a pair of engagement tabs are provided on each side wall, and wherein each tab on a first side wall is aligned across from a corresponding tab on the opposed second side wall.

28. A rack for housing a plurality of information storage medium cartridges; said rack comprising:
two opposing side walls and a bottom wall connected to said side walls, each of said side walls having a bottom edge and a top edge;
rib means interiorly attached at least to said side walls for partitioning said rack into cells for accommodating said plurality of cartridges; and,
wherein said bottom wall is spaced away from said bottom edge of said side walls, wherein beneath said bottom wall said side wall comprises a major side wall portion and an engagement tab, said major side wall portion of each side forming an essentially planar interior surface facing the other side wall, said tabs being dependent from their respective side walls in cantilevered manner, each of said tabs having an interior surface which is slightly out of the plane of its major side wall portion for its side wall, the interior surface of a tab of a side wall being inclined toward the opposing side wall but resiliently displaceable back into coplanar relationship with said major side wall portion of its side wall.

29. The apparatus of claim 28, wherein a pair of engagement tabs are provided on each side wall, and wherein each tab on a first side wall is aligned across from a corresponding tab on the opposed second side wall.

30. A rack for housing a plurality of information storage medium cartridges, said rack comprising:
two essentially parallel side walls and a bottom wall, said two side walls extending above said bottom wall by a first predetermined distance, each of said side walls having a bottom edge and a top edge;
rib means attached at least to said side walls for partitioning said rack into cells for accommodating said plurality of cartridges;
bridging means connecting said two parallel side walls, said bridging means being essentially orthogonal to said side walls;
a projection carried on said bridging means, said projection extending above said bottom wall by a second predetermined distance, said second predetermined distance being greater than said first predetermined distance, said projection having a readable indicia thereon,
retaining means provided in each cell to retain a cartridge therein; and,
wherein said bottom wall is spaced away from said bottom edge of said side walls, wherein beneath said bottom wall said side wall comprises a major side wall portion and an engagement tab, said major side wall portion of each side forming an essentially planar interior surface facing the other side wall, said tabs being dependent from their respective side walls in cantilevered manner, each of said tabs having an interior surface which is slightly out of the plane of its major side wall portion for its side wall, the interior surface of a tab of a side wall being inclined toward the opposing side wall but resiliently displaceable back into coplanar relationship with said major side wall portion of its side wall.

31. The apparatus of claim 24, wherein said means for engaging said lid gap is a ridge sized and situated so that said lid gap slides over said ridge.

32. A rack in combination with an information storage medium cartridge of the type having a light path window provided on a lid thereof and a lid gap provided between a cartridge lid and an face of a cartridge case, said rack comprising:

two essentially parallel side walls and a bottom wall connected to said side walls;

rib means attached at least to one of said walls for partitioning said rack into cells for accommodating a plurality of said cartridges;

retaining means provided in each cell to retain said cartridge therein, said retaining means for each cell comprising a pair of cantilevered finger members which extend upwardly into the interior of its cell from near the intersection of a side wall and said bottom wall, said fingers of each pair being resiliently displaceable away from one another to accommodate said cartridge therebetween; each of said cantilevered finger members having a retaining surface facing the other finger member with which it is paired, said retaining surface of each finger member having a projection extending therefrom in a directing toward the other finger member with which it is paired for engaging said light path window provided on a lid of said cartridge;

secondary rib means provided on said side walls for partitioning each of said cells into a half cell, and wherein in a cell said retaining means is located on said side wall between only one of said rib means forming said cell and said secondary rib means; and, cartridge lid gap engaging means formed on said ribs for fitting into a lid gap of said cartridge when said cartridge is inserted into a cell of said rack in a predetermined orientation, said cartridge lid gap engaging means comprises a ridge parallel to and slightly spaced apart from one of said sidewalls.

* * * * *